United States Patent
Parikh et al.

(10) Patent No.: US 12,218,907 B2
(45) Date of Patent: Feb. 4, 2025

(54) SUBNETWORK SELECTION

(71) Applicant: Capital One Services, LLC, McLean, VA (US)

(72) Inventors: Rahul Parikh, Plano, TX (US); Sugavaneswaran Selvaraj, Frisco, TX (US); Vijayalakshmi Narasimha Raju Kalidindi, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/206,884

(22) Filed: Jun. 7, 2023

(65) Prior Publication Data
US 2024/0414121 A1    Dec. 12, 2024

(51) Int. Cl.
H04L 61/50     (2022.01)
H04L 61/4511   (2022.01)
H04L 101/668   (2022.01)

(52) U.S. Cl.
CPC .......... H04L 61/50 (2022.05); H04L 61/4511 (2022.05); H04L 2101/668 (2022.05)

(58) Field of Classification Search
CPC . H04L 41/08; H04L 41/0803; H04L 41/0806; H04L 41/0889; H04L 61/4511;
(Continued)

(56) References Cited

U.S. PATENT DOCUMENTS 6,249,813 B1 *  6/2001  Campion ............ H04L 61/4511
                                                 709/222
9,049,247 B2    6/2015  Holloway et al.
                (Continued)

FOREIGN PATENT DOCUMENTS

WO    2013165837 A1    11/2013
WO    2017100640 A1     6/2017

OTHER PUBLICATIONS

Amazon Elastic Compute Cloud Elastic Network Interfaces pp. 1215-1249 2022.
(Continued)

Primary Examiner — Vivek Srivastava
Assistant Examiner — William C McBeth
(74) Attorney, Agent, or Firm — Christopher R. Glembocki

(57) ABSTRACT

A method, apparatus, and computer-readable medium are described that gather information from subnets of a virtual private cloud, compare the information of the subnets to criteria of components of a service, and identify selected subnets that comport with the criteria. The subnets may be associated with different availability zones. The selection of any subnet may affect the subnets available for the next selection. The process may dynamically adjust for previous subnet selections and may be available as a service. Based on a call to the service with criteria of the components, the service may request information regarding the subnets and return an identified list of subnets for the components. The process may accommodate services during development stages and during deployment stages and/or account for primary and secondary subnet assignments. By dynamically adjusting the available subnets, delays in subnet selection and subsequent deployment may be reduced.

20 Claims, 10 Drawing Sheets

(58) Field of Classification Search
CPC . H04L 61/50; H04L 61/5007; H04L 61/5061; H04L 2101/668
See application file for complete search history.

(56) References Cited

U.S. PATENT DOCUMENTS

| | | | |
|---|---|---|---|
| 10,761,875 B1* | 9/2020 | Burgin | H04L 67/306 |
| 11,323,303 B2 | 5/2022 | Seed et al. | |
| 2003/0053441 A1* | 3/2003 | Banerjee | H04L 61/5061 |
| | | | 370/352 |
| 2003/0069954 A1* | 4/2003 | Ma | H04L 61/5061 |
| | | | 709/223 |
| 2004/0184412 A1* | 9/2004 | Stephenson | H04L 61/5069 |
| | | | 370/254 |
| 2013/0018994 A1* | 1/2013 | Flavel | H04L 41/0806 |
| | | | 709/220 |
| 2017/0289095 A1* | 10/2017 | Jalan | H04L 61/5007 |
| 2020/0014590 A1 | 1/2020 | Deklich et al. | |
| 2020/0099653 A1* | 3/2020 | Strauss | H04L 61/5007 |
| 2021/0234830 A1* | 7/2021 | Maddu | H04L 61/5007 |
| 2022/0191168 A1* | 6/2022 | Snehashis | H04L 61/5061 |

OTHER PUBLICATIONS

What Are AWS Elastic Network Interfaces (ENIs), and How Do You Use Them HowToGeek Jul. 31, 2020.

\* cited by examiner

| Subnet ID | Availability Zone | | | | | Subnet Types | | | | | |
| --- | --- | --- | --- | --- | --- | --- | --- | --- | --- | --- | --- |
| | | | | | | Private | | | | Public (Web) | |
| | A | B | C | D | E | Database | API | App | Only receive calls from same SN | Receive calls from any SN | |
| 0 | ● | | | | | ● | | | | | |
| 1 | | | ● | | | | ● | | | | |
| 2 | ● | | | | | | | ● | | | |
| 3 | | | | ● | | | | ● | | | |
| 4 | | | | ● | | | | | ● | | |
| 5 | ● | | | | | ● | | | | | |
| 6 | | ● | | | | ● | | | | | |
| 7 | | | | | ● | | | | | ● | |
| 8 | | | | ● | | | | | | ● | |

FIG. 6

SUBNETWORK SELECTION

TECHNICAL FIELD

Aspects of the disclosure relate generally to cloud-based data processing operations.

DESCRIPTION OF THE RELATED ART

Cloud-based services may comprise resources deployed across different subnets. For instance, an entity may provide a virtual private cloud including both a public-facing gateway (e.g., accessible via the Internet) and a private gateway (e.g., accessible only from a customer's private gateway. The virtual private cloud may comprise multiple subnets. The subnets may include different types of subnets including, for example, private subnets providing database services, application programming interface (API) services, and/or supporting applications. The range of subnets may include public subnets (e.g., accessible via the Internet). To enhance security, some of the public subnets may be restricted to responding only to calls from the same subnet while others may be configured to respond to both internal and external calls.

Services deployed in virtual private clouds may be deployed to separate subnets based on the configurations and/or configurations of the subnets. For instance, for a given service, a database may be deployed to a private subnet configured only to support databases. API calls for the service may be handled by a virtual server in a different private subnet configured to handle API calls. Each subnet may comprise a range of internet protocol (IP) addresses. Over time, some of those IP addresses will be consumed by services, leaving a smaller quantity of IP addresses available for use in new services.

The various subnets may be interconnected and/or to one or more gateways via elastic network interfaces. Elastic network interfaces (e.g., available as part of the Amazon Elastic Compute Cloud by Amazon Web Services (AWS), a subsidiary of Amazon.com of Bellevue, Washington) are logical networking components in a virtual private cloud that represents a virtual network card. As needed, the ENI may be remapped to direct communications to different subnets or different networks. A cloud network may be partitioned into various regions with each region comprising multiple availability zones. Some virtual private clouds require components of services to use different availability zones, for instance, providing backup components when a given availability zone is unavailable. Instead of needing to remap an entire service, specific components of the service may be remapped via the ENIs.

When deploying a service, a developer may be required to identify particular subnets for each component of the service. The selection of a given subnet for a first component complicates the selection of subnets for the remaining components based on the diversity requirement of availability zones. Also, based on the developer's availability zone selections for some components, the developer may be restricted to remaining availability zones that provide insufficient resources for the remaining components of the new service. The developer may be forced to restart the subnet selections, thus delaying the deployment of the service. Based on the dynamic nature of each selection affecting future selections, the repeated delay in selecting subnets for a service prevents an efficient deployment of the service. Where the new service is directed to reducing processing delays associated with existing, overloaded services, the inability to quickly select appropriate subnets for the new service results in the continued overloading of existing services. Further, repeated calls by developers attempting to determine the available subnets for given availability zones increase the processing overhead for each availability zone, thus decreasing the responsiveness to future inquiries by other developers.

SUMMARY

The following presents a simplified summary of various aspects described herein. This summary is not an extensive overview and is not intended to identify key or critical elements or to delineate the scope of the claims. The following summary merely presents some concepts in a simplified form as an introductory prelude to the more detailed description provided below.

One or more aspects relate to providing a callable service that provides subnet selections for components of a new service in response to a designation of subnet requirements for each subnet. Through using the callable service, new services may be deployed more quickly by reducing the quantities of separate calls to determine the available subnets in specific availability zones. The new services may be deployed more quickly by reducing possible continued reformulation of subnet selection priorities before a complete set of subnets is selected.

According to one or more aspects, a computer-implemented method may comprise receiving, from a remote computing device, a first application programming interface (API) call identifying a quantity of required subnet types, sending, to a domain name service of a virtual private cloud, a second API call requesting a first list of subnets, and receiving, based on the second API call, the first list of subnets comprising, for each received subnet, a received subnet identification and a received subnet type. The computer-implemented method may further comprise determining, based on the required subnet types, a filtered list of received subnets with received subnet types that match the required subnet types and sending, to the domain name service, a third API call comprising the filtered list of the received subnets. The third API call may request second information regarding the filtered list of the received subnets. The computer-implemented method may further comprise receiving, based on the third API call, the second information, determining, based on a quantity of unassigned IP addresses of each subnet in the second information, a second list of subnets satisfying a minimum availability threshold, selecting, based on a percentage of available IP addresses of each subnet in the second information and the required subnet types of the required subnets, a first selected subnet having the highest percentage of available IP addresses and a first availability zone, and sending, based on the first API call to the remote computing device, the first selected subnet and a subnet type of first selected subnet.

In further aspects, the second information may comprise a total quantity of IP addresses of each subnet and a quantity of assigned IP addresses of each subnet. The computer-implemented method may further comprise calculating, based on the second information, the quantity of unassigned IP addresses of each subnet in the second information. Additionally or alternatively, the second information may comprise a total quantity of IP addresses of each subnet and a quantity of assigned IP addresses of each subnet. The method may include calculating, based on the second information, a percentage of available IP addresses of each subnet in the second information.

Additionally or alternatively, the method may further include selecting, based on the percentage of available IP addresses of each subnet, based on the second list of subnets, and based on the required subnet types, a second selected subnet having a second highest percentage of available IP addresses. A second availability zone of the second selected subnet may be different from the first availability zone. The sending of the first selected subnet further may comprise sending the second selected subnet as a second subnet of the required subnets.

Additionally or alternatively, the method may further include selecting, based on the first availability zone, based on the second availability zone, and based on a remaining quantity of required subnet types, additional subnets based on those subnets with the highest percentages of available IP addresses. An availability zone of each of the selected additional subnets may be diverse from the first availability zone, from the second availability zone, and from the availability zones of the additional subnet. The sending of the first selected subnet further may comprise sending the selected additional subnets as the remaining quantity of the required subnets.

Additionally or alternatively, the method may further include selecting, based on the selection of the first selected subnet, based on the percentage of available IP addresses of each subnet, based on the second list of subnets, and based on the required subnet types of the required subnets, a second selected subnet having a second highest percentage of available IP addresses; determining that a second availability zone of the second selected subnet matches the availability zone of the first selected subnet; discarding the selection of the second selected subnet; and selecting, based on the percentage of available IP addresses of each subnet, based on the second list of subnets, and based on the required subnet types, a third subnet having a third highest percentage of available IP addresses. A third availability zone of the third subnet is different from the availability zone of the first selected subnet. The sending of the first selected subnet further may comprise sending the third subnet as a second subnet of the required subnets.

Additionally or alternatively, the method may further include: selecting determining, based on the selection of the first selected subnet, that the quantity of required subnets has not been satisfied; and selecting, based on the determination that the quantity of required subnets has not been satisfied, based on the percentage of available IP addresses of each subnet, based on the second list of subnets, and based on the required subnet types, a second selected subnet having a second highest percentage of available IP addresses. A second availability zone of the second selected subnet is different from the first availability zone of the first selected subnet. The sending of the first selected subnet further may comprise sending the second selected subnet as a second subnet of the required subnets.

Additionally or alternatively, the method may further include: determining, based on required subnet types, based on the availability zone of the first selected subnet, based on a second filtered list of subnets with received subnet types, based on matching the required subnet types, and based on availability zones, not matching the first availability zone of the first selected subnet; and selecting, from the second filtered list of subnets, a second selected subnet having the highest percentage of available IP addresses. The method may further comprise sending the second selected subnet as a second subnet of the required subnets.

Additionally or alternatively, the method may further include: determining, for each remaining required subnet, based on the required subnet types of the required subnets, and based on availability zones of previously selected subnets, filtered lists of subnets; and selecting, from the filtered lists of subnets, additional subnets based on those subnets with the highest percentages of available IP addresses. The method may send the selected additional subnets as the required subnets. The filtered list of subnets may comprise subnets with subnet types matching the required subnet types of remaining required subnets. The filtered list of subnets may comprise subnets with availability zones not matching the availability zone of the previously selected subnets.

Additionally or alternatively, the required subnet type may identify the subnet as a private database type of subnet configured to host a database; a private API type of subnet configured to host a service for receiving and responding to API calls; an application type of subnet configured to host a service for supporting an application executing on a mobile device; a first public web-based type of subnet configured to respond only to intra-subnet communications; or a second public web-based type of subnet configured to respond to intra-subnet communications and inter-subnet communications.

Additional aspects, configurations, embodiments, and examples are described in more detail below.

BRIEF DESCRIPTION OF DRAWINGS

The present disclosure is illustrated by way of example and not limited in the accompanying figures in which like reference numerals indicate similar elements and in which:

FIG. 6 depicts a table identifying, for a set of subnets in a virtual private cloud, availability zones and characteristics of each subnet;

Figure 1:
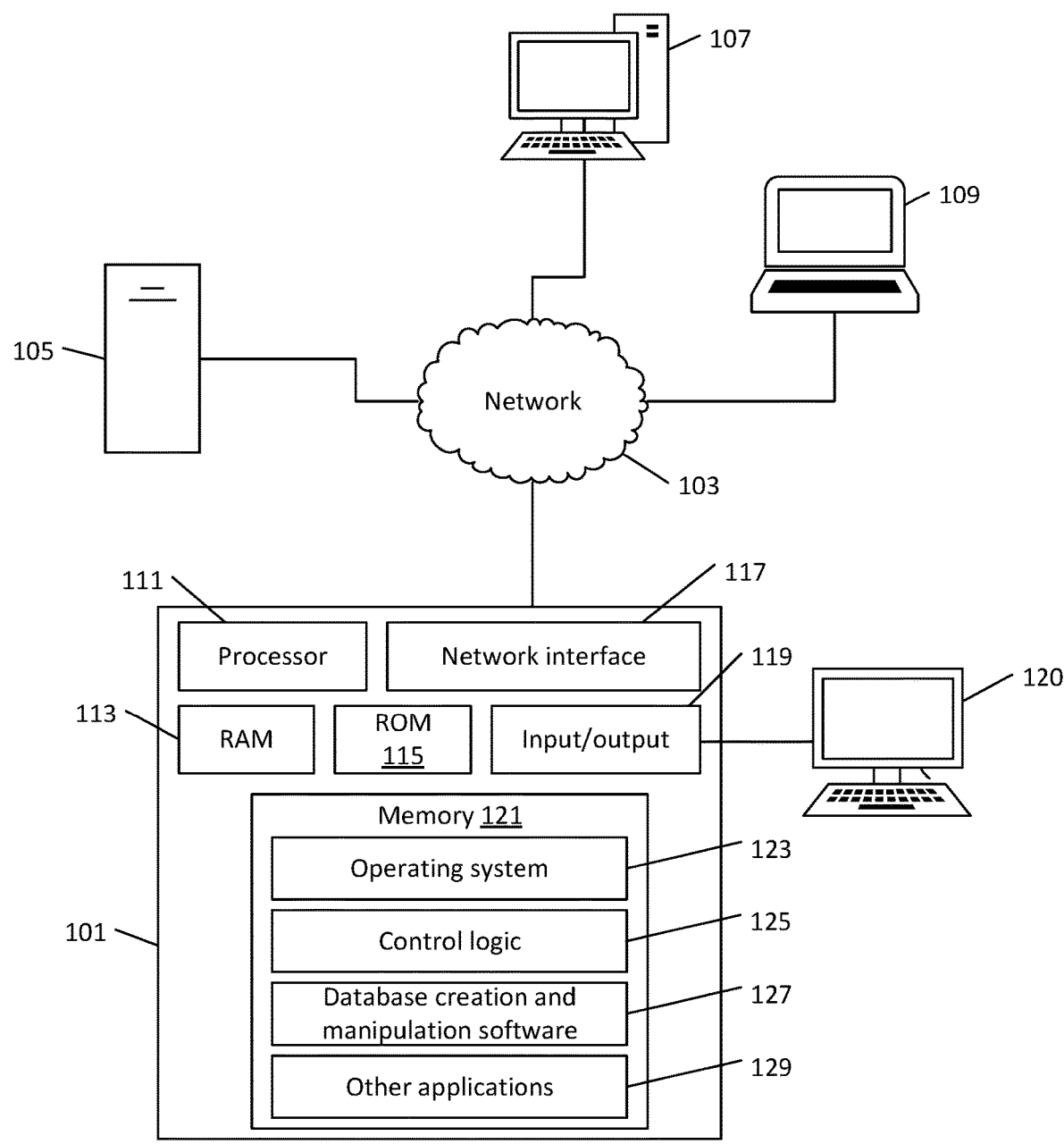
FIG. 1 depicts an example of a computing device and system architecture that may be used in implementing one or more aspects of the disclosure in accordance with one or more illustrative aspects discussed herein.

It will be recognized by the skilled person in the art, given the benefit of this disclosure, that the exact arrangement, sizes, and positioning of the components in the figures are not necessarily to scale or required.

DETAILED DESCRIPTION

Certain aspects relate to improving how online services are deployed by, for instance, improving how quickly and efficiently subnets for components of those services are determined and provided to the developing computer platforms. Some online services are provided in virtual private clouds. For instance, Amazon Web Services (AWS), a subsidiary of Amazon.com of Bellevue, Washington, provides virtual private clouds to support the online services of companies. The online services may include any variety of services including, but not limited to, recordkeeping, support for applications running on users' smartphones, account management, eCommerce, and other services. Virtual private clouds may host the services in various subnets. To provide diversity to the components of each service, as well as a form of load balancing, the components may be associated with different availability zones of the virtual private cloud. The resulting separation of components into different availability zones permits better up-time for the overall service by needing to only failover a limited quantity of components from an unavailable subnet in an unavailable availability zone to a backup subnet. In contrast, where all components are in a single availability zone and when that single availability zone becomes unavailable, all components would need to be failed over to a new availability zone. For failover purposes, restarting a failed component may be significantly easier than restarting a service comprising multiple failed components.

The various components may be connected by elastic network interfaces (ENIs). The ENIs provide virtual network interfaces to connect services' components to each other and to various network gateways and/or servers. In the event of a failure of a subnet or availability zone, ENIs' may be updated to send network traffic to a backup subnet or availability zone as needed. The ENIs' address tables for the primary and backup network addresses may be populated on the deployment of a service.

Services customarily experience a development phase and a later deployment phase. During the development phase, a service may be tested and subsequently modified to ensure it may be able to perform as anticipated. While in the development phase, a first set of subnets may be assigned based on first criteria of components of the service. For instance, the components may require a database subnet, an API subnet, and a public-facing subnet, and first quantities of IP addresses in each subnet to support the service while in its development phase (e.g., 10 IP addresses for the database subnet, 5 IP addresses for the API subnet, and 5 IP addresses for the public-facing subnet). Using the process described herein, a first set of subnets may be identified for the service. Later, when ready for deployment, the process may identify a new set of subnets based on different criteria for the components. For example, during the deployment phase, the components may have different subnet requirements. For instance, the quantity of IP addresses needed for each component in the respective subnets may have changed to 15 IP addresses for the database subnet, 5 IP addresses for the API subnet, and 3 IP addresses for the public-facing subnet. As shown in this example, the quantities of IP addresses for any subnet may increase, decrease, or stay the same between the development phase and deployment phase of the service. Further, the criteria may identify how many subnets are needed for each component. For instance, a database component may require 2-3 separate subnets during the development phase and require 3-5 subnets during the deployment phase. In some examples, the criteria may request a set of subnets for the service. In other examples, the criteria may identify that multiple levels of subnets are required, e.g., a primary set of subnets for deployment and a secondary, backup set for failover. Additionally or alternatively, the process may segment the selection of subnets. For instance, the criteria may include an indication of whether the desired subnets are for a primary deployment or whether for a backup deployment. Further, the criteria may identify that the backup subnets are to be selected regardless of the selection of the primary subnets. Additionally or alternatively, the criteria may be sent to the selection process in two, interconnected phases: as first criteria indicating the desired subnets are for a primary deployment; and as second criteria indicating the desired subnets are for a backup deployment with identification of previously received primary deployment subnets.

In the following description of the various embodiments, reference is made to the accompanying drawings, which form a part hereof, and in which is shown by way of illustration of various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. Any sequence of computer-implementable instructions described in this disclosure may be considered to be an "algorithm" as those instructions are intended to solve one or more classes of problems or to perform one or more computations. While various directional arrows are shown in the figures of this disclosure, the directional arrows are not intended to be limiting to the extent that bi-directional communications are excluded. Rather, the directional arrows are to show a general flow of steps and not the unidirectional movement of information. In the entire specification, when an element is referred to as "comprising" or "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by a combination of hardware and software. In addition, terms such as " . . . unit" and " . . . module" described in the specification mean a unit for performing at least one function or operation, which may be implemented as hardware or software, or as a combination of hardware and software. Throughout the specification, the expression "at least one of a, b, and c" may include 'a only', 'b only', 'c only', 'a and b', 'a and c', 'b and c', and/or 'all of a, b, and c'.

It is noted that various connections between elements are discussed in the following description. It is noted that these connections are general and, unless specified otherwise, may be direct or indirect, and that the specification is not intended to be limiting in this respect. As described herein, thresholds are referred to as being "satisfied" to generally encompass situations involving thresholds above increasing values as well as encompass situations involving thresholds below decreasing values. The term "satisfied" is used with thresholds to address when values have passed a threshold and then approaching the threshold from an opposite side using terms such as "greater than", "greater than or equal to", "less than", and "less than or equal to" can add ambiguity where a value repeated crosses a threshold.

General Framework

Before discussing the concepts of the disclosure in greater detail, however, several examples of a computing device that may be used in implementing and/or otherwise providing various aspects of the disclosure will first be discussed with respect to FIG. 1. FIG. 1 illustrates one example of a computing device 101 that may be used to implement one or more illustrative aspects discussed herein. For example, the computing device 101 may, in some embodiments, implement one or more aspects of the disclosure by reading and/or executing instructions and performing one or more actions based on the instructions. In some embodiments, the computing device 101 may represent, be incorporated in, and/or include various devices such as a desktop computer, a computer server, a mobile device (e.g., a laptop computer, a tablet computer, a smartphone, any other types of mobile computing devices, and the like), and/or any other type of data processing device.

The computing device 101 may, in some embodiments, operate in a standalone environment. In others, the computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109, and other devices (not shown) may be connected to one or more of the networks via twisted pair wires, coaxial cables, fiber optics, radio waves, or other communication media. Additionally or alternatively, the computing device 101 and/or the network nodes 105, 107, and 109 may be a server hosting one or more databases.

As seen in FIG. 1, the computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with database operations. Input/output 119 may include a variety of interface units and drives for reading, writing, displaying, and/or printing data or files. Input/output 119 may be coupled with a display such as display 120. Memory 121 may store software for configuring computing device 101 into a special-purpose computing device in order to perform one or more of the various functions discussed herein. Memory 121 may store operating system software 123 for controlling the overall operation of the computing device 101, control logic 125 for instructing the computing device 101 to perform aspects discussed herein, database creation and manipulation software 127, and other applications 129. Control logic 125 may be incorporated in and may be part of database creation and manipulation software 127. In other embodiments, the computing device 101 may include two or more of any and/or all of these components (e.g., two or more processors, two or more memories, etc.) and/or other components and/or subsystems not illustrated here.

Devices 105, 107, and 109 may have similar or different architecture as described with respect to the computing device 101. Those of skill in the art will appreciate that the functionality of the computing device 101 (or device 105, 107, 109) as described herein may be spread across multiple data processing devices, for example, to distribute processing load across multiple computers, to segregate transactions based on geographic location, user access level, quality of service (QOS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Python, JavaScript, or an equivalent thereof. The computer-executable instructions may be stored on a computer-readable medium such as a hard disk, optical disk, removable storage media, solid-state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer-executable instructions and computer-usable data described herein. Various aspects discussed herein may be embodied as a method, a computing device, a data processing system, or a computer program product. Having discussed several examples of computing devices which may be used to implement some aspects as discussed further below, discussion will now turn to a method for classifying textual data using a machine-learning classifier.

Figure 2:
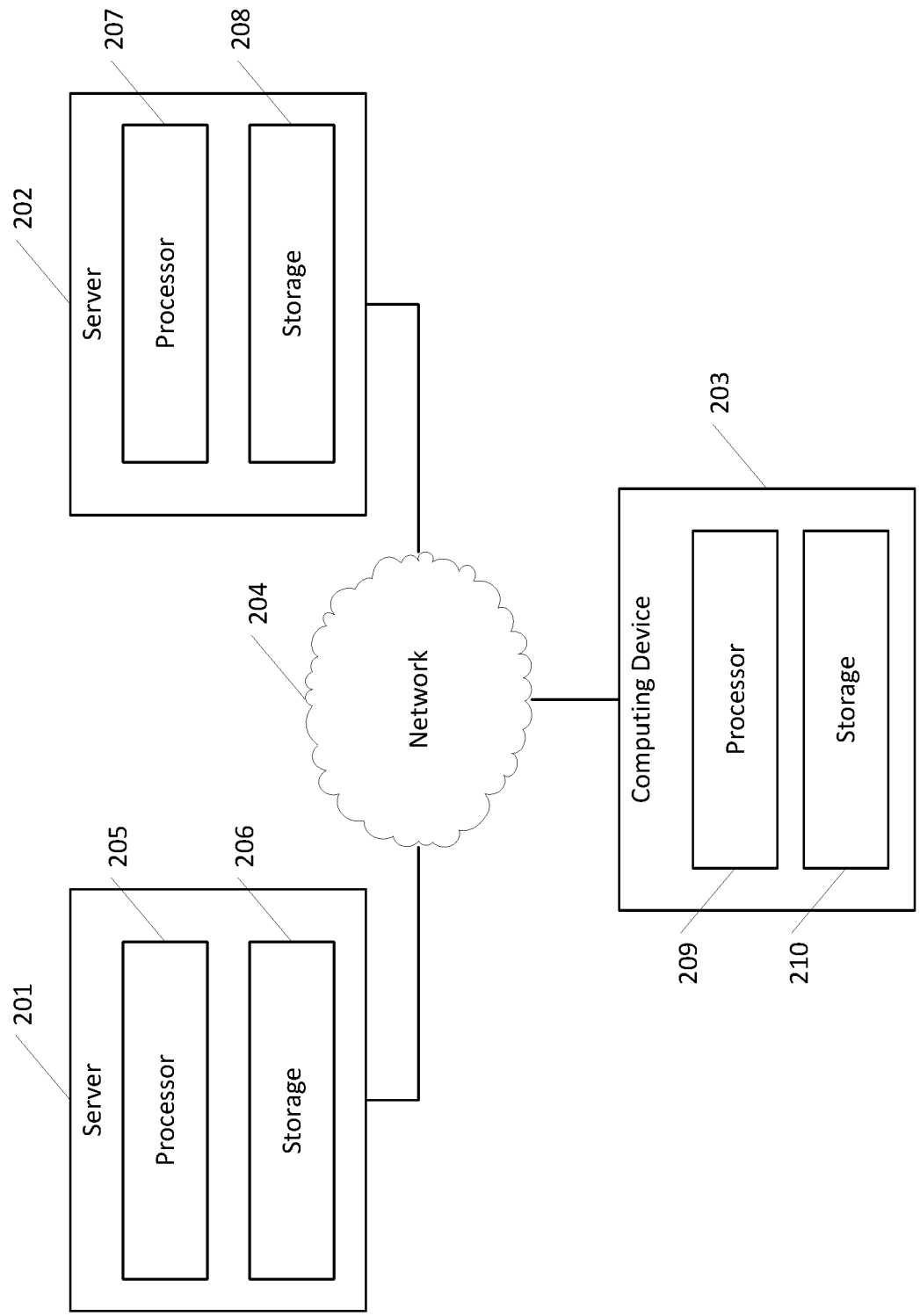
FIG. 2 depicts a block diagram of an environment in which systems and/or methods described herein may be implemented.

FIG. 2 is a block diagram of an environment in which systems and/or methods described herein may be implemented. As shown in FIG. 2, the environment may include servers 201 and 202 and a computing device 203 connected by a network 204. The devices, servers, and network may be interconnected via wired connections, wireless connections, or a combination of wired and wireless connections. The server 201 may be directed toward receiving files relating to activities from computing device 203 and then sending the files to server 202 for processing.

The network 204 may include one or more wired and/or wireless networks. For example, network 204 may include a cellular network (e.g., a long-term evolution (LTE) network, a code division multiple access (CDMA) network, a 3G network, a 4G network, a 5G network, another type of next-generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more servers shown in FIG. 2 may be implemented within a single server, or a single server shown in FIG. 2 may be implemented as multiple, distributed servers or in a cloud-based computing environment. A set of devices (e.g., one or more devices 203) of the environment may perform one or more functions described as being performed by another set of devices of the environment. Network 204 may be represented as a single network but may comprise combinations of other networks or subnetworks. For example, the server 201 may store, in storage 206, a list of domain name systems 202 that provide virtual private clouds. The processor 205 of the server 201 may provide, upon request, subnets in the virtual private cloud, supported by server 202, and information relating to each of those subnets. One or more of these capabilities may be obtained via an exposed API.

Storage 208 of server 202 may include information for supporting a domain name system (DNS). The processor 207 may, upon request from processor 205 of server 201, obtain, from storage 208, a collection of subnets in the virtual private cloud and information related to each subnet including, for instance, a maximum quantity of IP addresses in each subnet, quantities of consumed and/or available IP addresses in each subnet, availability zones of the subnets, types of the subnets, and/or other information. The computing device 203 may request information regarding the subnets of a virtual private cloud, via one or more API calls to server 201. The API calls may be singular in nature (e.g., requesting all information for all subnets in the virtual private cloud) or comprise multiple API calls, each requesting different categories of information. For instance, as an example of multiple API calls, a first API call may request the types of all subnets. A second API call may request information on specific subnets. After the first API call and before the second API call, the server 201 may have returned the list of available subnets and the subnet type of each. The processor 209 may filter the subnets by the subnet types corresponding to criteria for components of a service. Based on the filtering, the processor 209 may request, from server 201, information on specific subnets. The requests to server 201 from computing device 203 may comprise API calls or other messages. The server 201 may request information from server 202 via API calls or other messages. The computing device 203 may store, in storage 210, configuration information for a service to be deployed into the virtual private cloud managed at least in part by server 202. Results of the identification of the subnets may be provided to a developer as a selectable set of subnets as categorized relative to the criteria of the components. In one or more optional additions, the results of the identification of the subnets may populate configuration information for the new service. By directly populating the configuration information for the new service, a time between requesting the subnets for the components and identifying a final set of identified subnets for the components is reduced. That reduction in time may reduce an error rate of subnet identification (e.g., copy and paste errors) by pushing the relevant subnet identification to the developer as a complete set of subnet identifications at a given time, thus reducing an opportunity for other developers to claim portions of the subnets and limit their availability to the original developer.

To assist with the explanation of the concepts described here, the disclosure includes the following sections: Virtual Private Clouds and Subnet Selection; Subnets with Available IP Addresses; Project Development and Project Deployment; Subnets by Availability Zones and Types; Processes for Selecting Subnets; and Project Provisioning.

Virtual Private Clouds and Subnet Selection

Figure 3A:
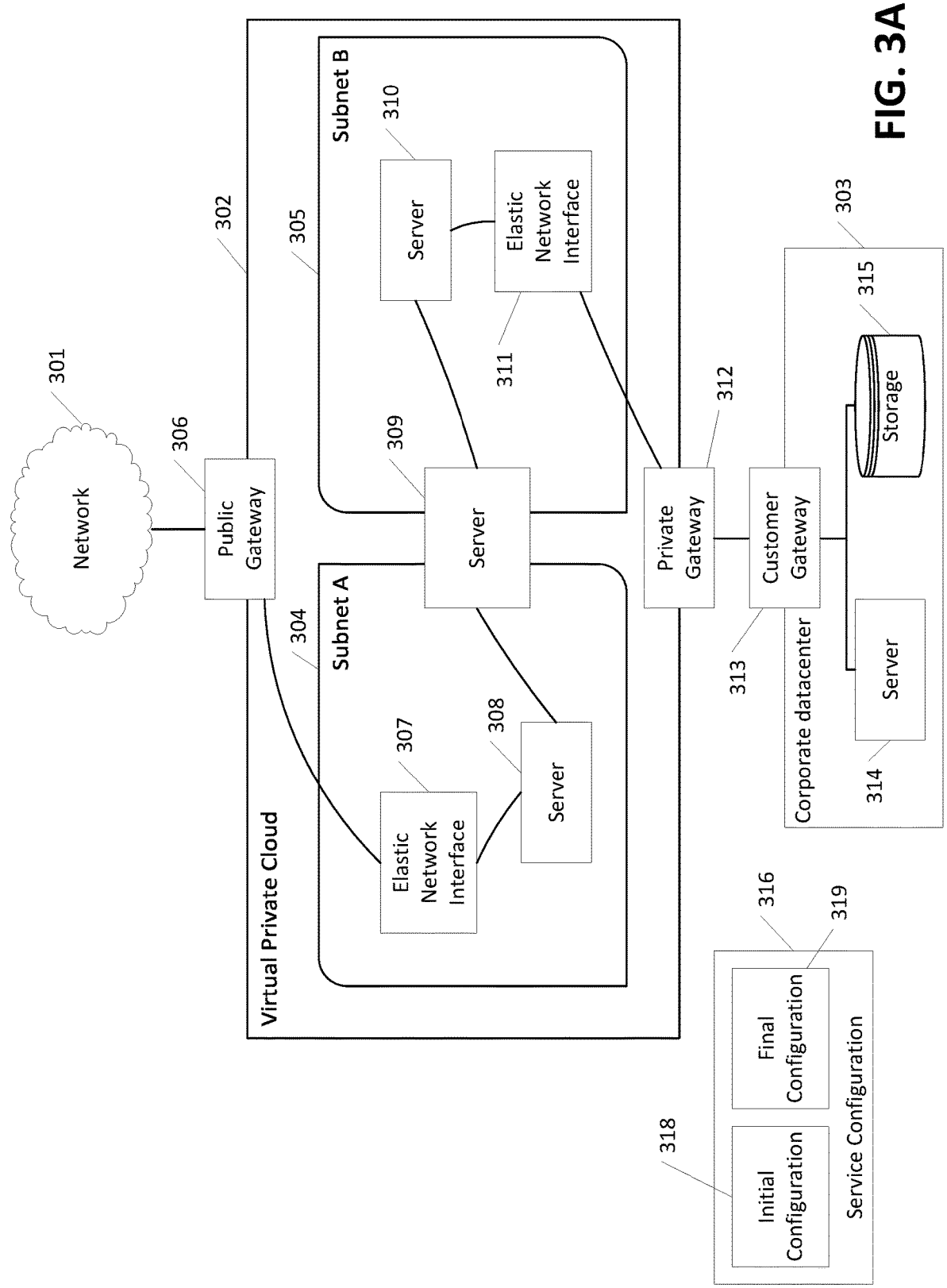
FIG. 3A depicts a network arrangement for a virtual private cloud and a customer datacenter.

FIG. 3A depicts a network arrangement for a virtual private cloud and a customer data center. A network 301 may be connected to a virtual private cloud 302 via a public gateway 306. The virtual private cloud 302 may comprise a plurality of subnets, e.g. subnet A 304 and subnet B 305. A server 309 connects subnet 304 and subnet 305. Subnet A 304 may include an elastic network interface 307 and a server 308. Subnet B 305 may include an elastic network interface 3011 and a server 310. Virtual private cloud 302 may also include a private gateway 312 that is configured to exchange messages with a corporate data center 303 via a customer gateway 313. The corporate data center 303 may include a server 314 and a storage 315. Messages may be exchanged between the network 301 and the corporate data center 303 via the virtual private cloud. More particularly, the virtual private cloud 302 may host a service with components distributed across the virtual private cloud 302 where various ones of the components (not shown) are resident in server 308 or server 310. For purposes of explanation, the subnet A 304 and the subnet B 305 are assumed to be in separate availability zones.

The networked components of FIG. 3A may permit messages to flow, via the network 301 and the virtual private cloud 302, between user devices (not shown) and the corporate datacenter 303. For example, a message may be received, via the network 301, from a remote user device (not shown) at the public gateway 306 of the virtual private cloud 302. The public gateway may forward the message to subnet A 304 by addressing the message to elastic network interface 307. The elastic network interface 307 may forward the message to the server 308. Next, based on the content of the message, the message may be forwarded to server 309, which then directs the message to server 310 in subnet 305. The message is processed, in server 310, and then routed, via elastic network interface 311, to the private gateway 312. The private gateway may direct the message to the customer gateway 313 of the corporate datacenter 303. The corporate datacenter processes the message using the server 314. The message and/or result of the processing of the message may be stored in storage 315.

If a message is to be sent from the corporate data center 303 to the remote user, the message may be generated by server 314 in the corporate datacenter 303, based on information from storage 315, and forward the message to the private gateway 312 using the customer gateway 313. The private gateway 312 may forward the message to the ENI 311 of subnet B 305. The message may be processed by the server 310 of subnet B 305 and forwarded to server 308 of subnet A 304, via server 309. The server 308 may process the message and forward it, via ENI 307, to the public gateway 306. The message is then sent to the network 301 and eventually to the remote user.

The messages sent between the remote user and the corporate datacenter 303 may comprise a plurality of individual messages. Further, other messages may be processed in the virtual private cloud 302, and results returned without making a full trip between the corporate datacenter 303 and the remote user.

FIG. 3A also shows a service about to be deployed to the virtual private cloud 302. The configuration information for the service (the service configuration 316). Before being deployed, a service may have an initial configuration 318. The initial configuration 318 may identify, for each component of the service, a quantity of subnets desired for each component, a quantity of IP addresses to be consumed by each component in the subnets, whether the returned subnets will be used for a primary usage or backup during a failure of a subnet, and/or whether the deployment of the service will be during a developmental phase or active service phase. Once the subnets for the components have been identified, the subnet selections may be stored as part of the final configuration 319 of the service.

Figure 3B:
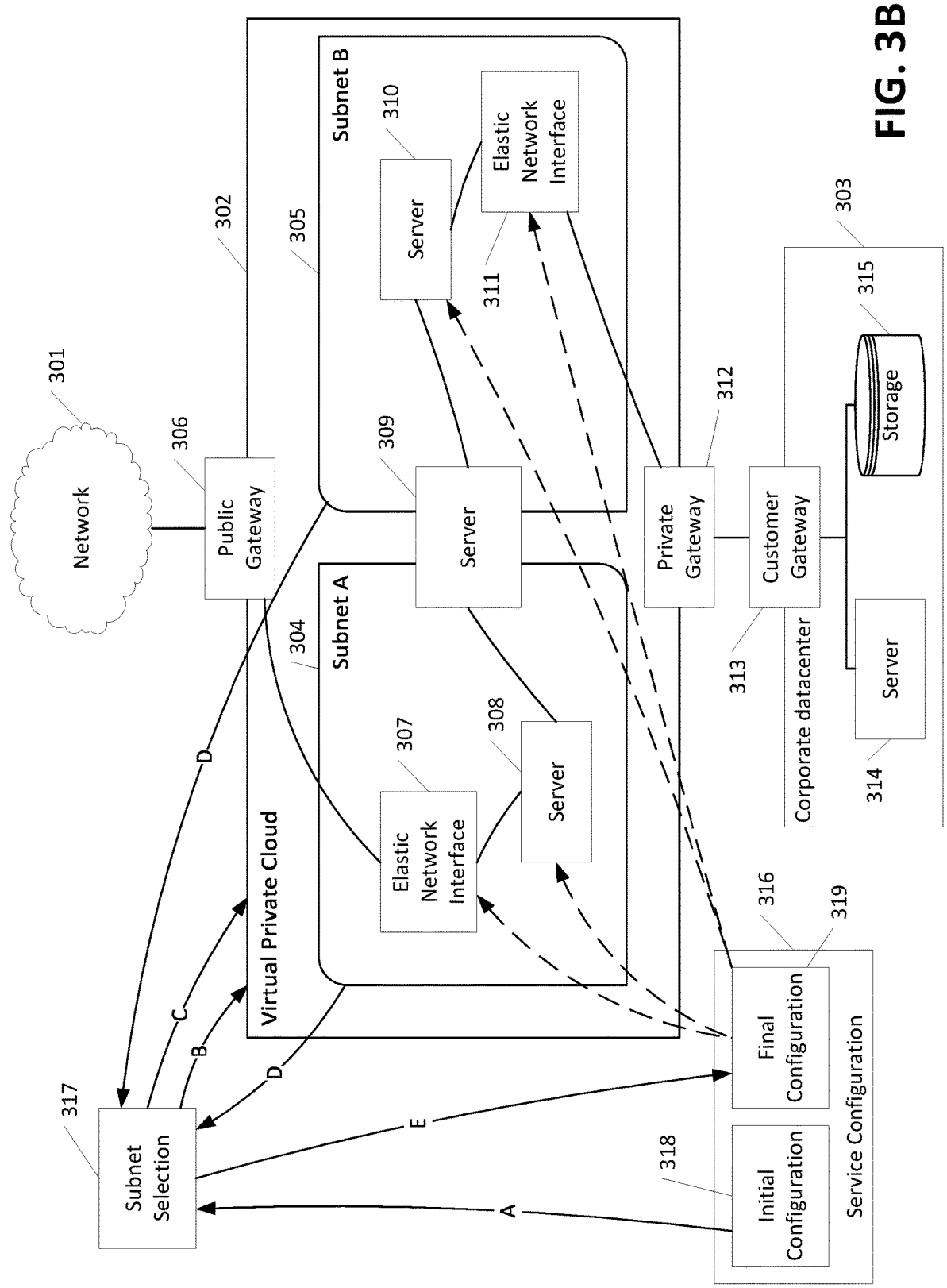
FIG. 3B depicts messages being exchanged across the network arrangement of FIG. 3A.

FIG. 3B depicts messages being exchanged across the network arrangement of FIG. 3A. The components of FIG. 3A are reproduced in FIG. 3B. FIG. 3B also includes a subnet selection service 317. The subnet selection service 317 may be a service callable via one or more APIs. Once called, the subnet selection service 317 may request information from the subnets of the virtual private cloud 302. The subnet selection service 317 may request, at any time, all information from the subnets, may request only limited information, or may request selective information. For instance, the subnet selection service 317 may request all information from the subnets including their ranges of IP addresses, their consumed and/or available IP addresses, their availability zones, and/or other information. Additionally or alternatively, the subnet selection service 317 may only request a subset of information regarding the subnets. Later, based on a selection of desired types of subnets and/or availability zones of the available subnets, the subnet selection service 317 may request further information from a limited set of the subnets.

For example, an initial configuration of a service may be stored in service configuration 316 as initial configuration 318. The initial configuration 318 may include a list of components for the service, a quantity of subnets desired for one or more components of the service, and/or a quantity of IP addresses desired for the subnets (e.g., per component per subnet and/or per component across all subnets). The subnet selection process 317 is shown separately from the virtual private cloud 302 for explanatory purposes. The subnet selection process 317 may reside in the virtual private cloud 302 or may be separate from the virtual private cloud 302. If in the virtual private cloud 302, it may reside in server 309, server 308, server 310, or in another server (not shown). Additionally or alternatively, the subnet selection process 317 may reside in server 314 or another server within the corporate datacenter 303. Additionally or alternatively, the subnet selection process 317 may reside in a server distinct from each of the virtual private cloud 302 and the corporate datacenter 303.

The initial configuration 318 may be sent (shown by arrow A) to the subnet selection process 317 via an API call with the initial configuration 318 as the body of the API call, as part of one or more headers of the API call, or via another file transfer process. The subnet selection process may request information (shown by arrows B and C) from the subnets in the virtual private cloud 302, receive the information (shown as arrows D), select the subnets and assign them to the components of the service, and return (shown as arrow E) the final configuration of the service 319 to the service configuration 316. Based on the final configuration 319, the service may be deployed to the virtual private cloud 302—e.g., to the servers 308 and 310 and the ENIs 307 and 311. The final configuration 319 may include updates (shown by dashed arrows) for other components in the virtual private cloud 302 including updates to the public gateway 306, the private gateway 312, and/or other components.

Subnets with Available IP Addresses

Figure 4:
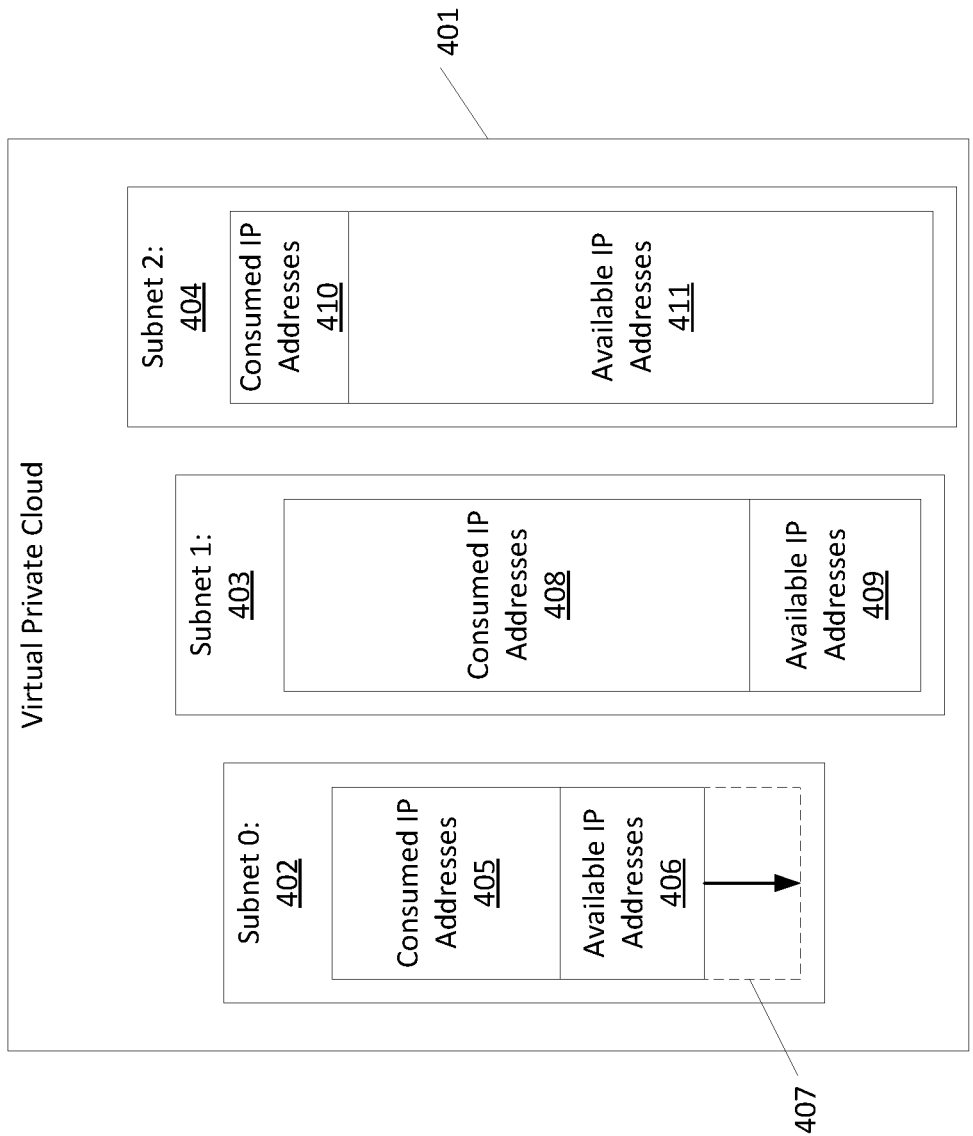
FIG. 4 depicts a plurality of subnets in a virtual private cloud, where each subnet has both consumed IP addresses and available IP addresses.

FIG. 4 depicts a plurality of subnets in a virtual private cloud, where each subnet has both consumed IP addresses and available IP addresses. A virtual private cloud 401 is shown with three subnets: subnet 0 402, subnet 1 403, and subnet 2 404. Each subnet has a total quantity of IP addresses of which some are already assigned (e.g., referred to herein as "consumed") and unassigned IP addresses (e.g., referred to herein as "available"). For instance, subnet 0 402 includes consumed IP addresses 405 and available IP addresses 406. Subnet 0 also includes a possible range of future IP addresses 407 that may be made available as needed to increase the total quantity of IP addresses in subnet 0 402. Subnet 1 403 includes consumed IP addresses 408 and available IP addresses 409. Subnet 2 404 includes consumed IP addresses 410 and available IP addresses 411. Comparing the quantities of IP addresses in each of subnet 0 402, subnet 1 403, subnet 2 404, subnet 0 402 includes the fewest quantity of IP addresses. Subnet 1 403 includes the next greater quantity of IP addresses and Subnet 2 404 includes the greatest quantity of IP addresses. At a current time, the quantity of available IP addresses in each of subnet 0 402 and subnet 1 403 are approximately equal. However, after IP addresses 407 are made available to subnet 0 402, the quantity of available IP addresses in subnet 0 402 will exceed the quantity of available IP addresses in subnet 1 403. Subnet 2 404 includes the greatest quantity of available IP addresses 411 of all subnets in the virtual private cloud 401.

Project Development and Project Deployment

Figure 5:
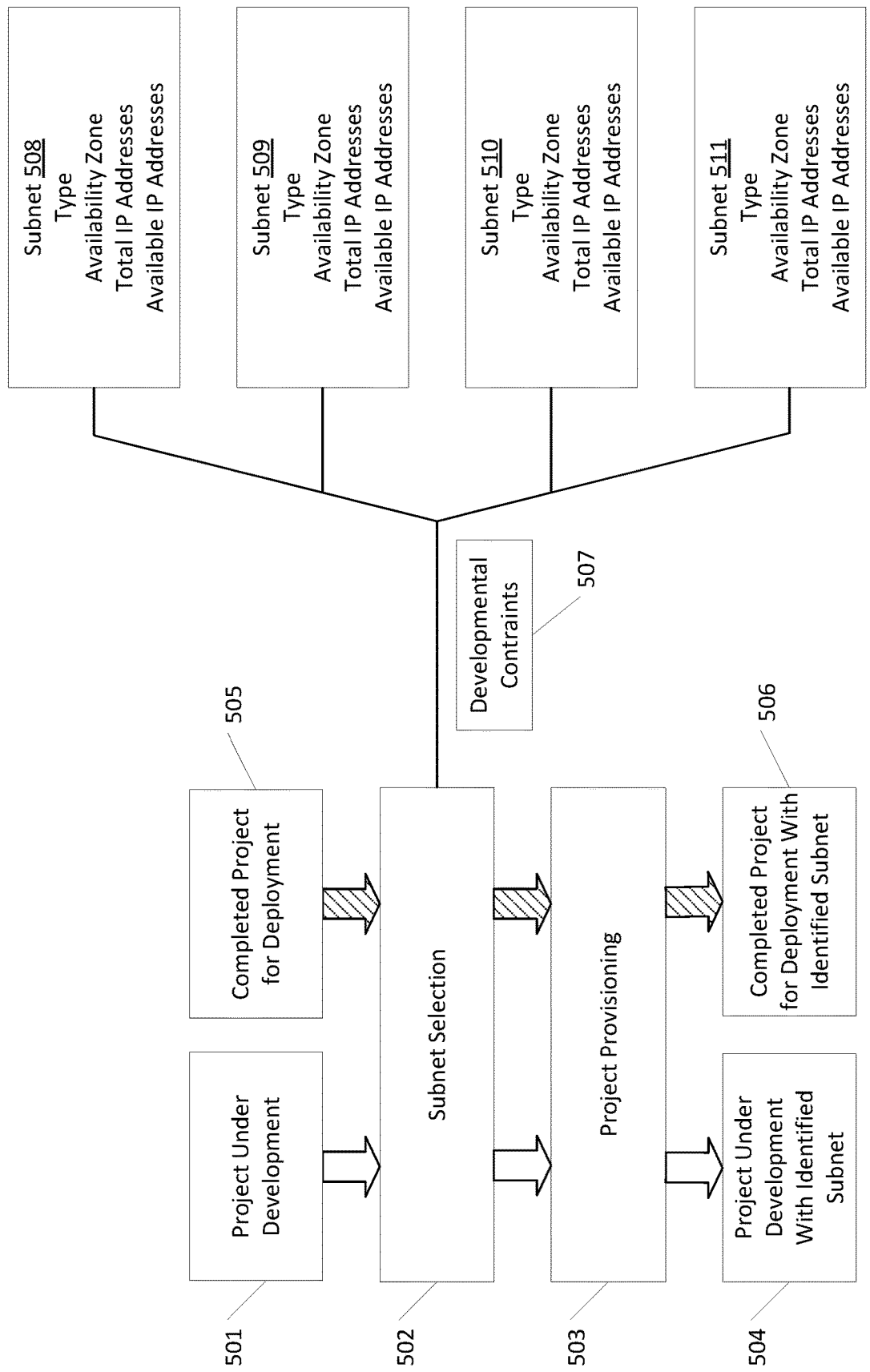
FIG. 5 depicts a process for developing and/or deploying a project by selecting subnets via a callable service.

FIG. 5 depicts a process for developing and/or deploying a project by selecting subnets via a callable service. In FIG. 5, a project is being developed in step 501. The project may have its components identified and the quantities of IP addresses desired for one or more of the components. Configuration information associated with the project under development in step 501 may indicate that the project is still in its developmental phase.

The configuration information may be sent to a subnet selection process 502. The subnet selection process 502 may obtain the configuration information from step 501. The subnet selection process 502 may determine whether the configuration information identifies that the project is under development or is ready for final deployment as an active service. The subnet selection process 502 may compare, for instance, whether the desired quantities of subnets and/or IP addresses for each component are within a range appropriate for its developmental phase. For example, during a developmental phase, a range of subnets for a given component may be between 1-2 subnets. However, for final deployment, the range of subnets for the given component may range between 2-4 subnets. These values are only examples and other values may be used as desired. If the configuration information lacks the quantity of subnets desired for the given component, the subnet selection process 502 may use a default value as the desired quantity of subnets for the given component. If the desired quantity of subnets for the given component is specified in the configuration information but is outside of the range of subnets for the given phase of development or deployment, the default value may be used instead of the requested (yet out of range) quantity of subnets. A similar process may be used for the identified quantity of IP addresses for each subnet per component (e.g., checking whether a desired quantity of IP addresses is within a default range for a developmental phase and then, if out of the range, using a default value).

The subnet selection process 502, based on the configuration information from step 501, requests and receives subnet information from subnet 508, subnet 509, subnet 510, and subnet 511. The types of information that may be retrieved by the subnet selection process 502 may include a type of the subnet, an availability zone of the subnet, a total quantity of IP addresses in the subnet, and the available IP addresses in the subnet. Additionally or alternatively, the subnets may return the assigned (unavailable) IP addresses. The information may be returned at one time or may be retrieved in stages. For instance, one or more portions of the configuration information may be used at developmental constraints 507 to request only specific types of information from the subnets 508-511 (e.g., the types of subnets or a percent availability of IP addresses or a quantity of available IP addresses per subnet, etc.). The information may be returned from the subnets 508-511 and processed by the subnet selection process 502. The subnet selection process 502 may request the information from the subnets 508-511 via one or more API calls. Additionally or alternatively, the subnet selection process 502 may request the information via another messaging process.

In response to the request from the subnet selection process 502, the subnet information from the subnets 508-511 is gathered and sent to the subnet selection process 502. The subnet information may be sent individually from each subnet of subnets 508-511. Additionally or alternatively, the subnet information may be gathered by server 309 and/or another server in the virtual private cloud 302 and sent to the subnet selection process 502. Additionally or alternatively, the subnet information may be gathered from a variety of sources including one or more servers located outside the virtual private cloud 302, e.g. in the corporate datacenter 303 and/or by one or more servers via the network 301. The subnet information returned to the subnet selection process 502 may be sent as a return message as a response to the API call from the subnet selection process. Additionally or alternatively, the response may be sent as an independent message. For explanatory purposes, the messaging is explained as API calls and responses but may be other types of messaging.

The API call from the subnet process 502 to obtain the subnet information may include some, none, or all of the configuration information of the project. The configuration information sent to the subnets 508-511 or another server to obtain the subnet information is represented as developmental constraints 507. The developmental constraints 507 may be a request for specific information regarding the subnets. Additionally or alternatively, the developmental constraints 507 may be a filter that limits the subnet information received by the subnet selection process 502. In response to the subnet information being received by the selection process 502, the subnet selection process selectively applies the requirements of the configuration information to identify specific subnets in the virtual private cloud 302 that comport with the requirements of the components of the service.

Once the specific subnets have been selected, the configuration information of the services is updated via a project provisioning process 503. The provisioning process 503 may populate the subnet or subnets for the one or more components of the service. For example, the service may include a database component. The subnet selection process 502 may have identified that both subnet 508 and subnet 509 are database subnet types. Subnet 509 may have a greater percentage of available IP addresses of all IP addresses of subnet 509 and/or have more available IP addresses. Other constraints may be applied in addition to or in place of these identified constraints. The subnet selection process 502 may select, for the database component of the service, subnet 509. Based on the selection of the subnet 509 for the database component, the project provisioning process 503 may provision the database component with the subnet 509. The other components of the service may be provisioned using a similar process. In addition, an availability zone of the subnet 509 may be retained by the subnet selection process 502 once the subnet 509 has been designated for the database component of the service. The selection of subnets for the other components of the service may be made to avoid subnets in the same availability zone as subnet 509. As other subnets are selected for the other components of the service, the quantity of selectable availability zones decreases. Where multiple subnets are located in a given availability zone and where one of the subnets has been assigned to a component of the service, the given availability zone may no longer be available. Similarly, even though other subnets in the given availability zone may be compatible with the requirements of one or more other components of the service, those subnets may be ignored for future subnet selections by the subnet selection process 502. Other subnets in other availability zones may be selected via the subnet selection process 502 for the remaining components. Based on the selection of the subnets for the remaining components, the configuration information for the service may be provisioned, via the project provisioning process 503, with the subnets for the components.

The provisioned configuration information for the project may be output (in step 504) as the provisioned project under development with identified subnets. The provisioned project may be deployed for testing using the output from step 504. Once deployed, the project under development may be modified to adjust the requirements for the existing components, add new components, and/or remove existing components from the configuration information. The process of FIG. 5 may be performed for a second or additional time to reprovision the configuration information with new subnet selections. For reference, the reprovisioning of projects under development is shown by the unshaded arrows of FIG. 5. Once a project is ready for final deployment (e.g., to become part of an active service), the provisioning process of FIG. 5 may be performed again. The provisioning of a project for final deployment (as a completed project for deployment 505) is shown in the shaded arrows of FIG. 5. A result of the provisioning of the project 505 results in a completed project for deployment with identified subnets 506. Based on the provisioned final project 506, the project may be deployed to the virtual private cloud 302.

Some configuration information may specify a quantity of subnets and/or quantity of IP addresses desired for each component in the project. Other configuration information may not specify the quantity of subnets and/or the quantity of IP addresses. In the event that the configuration information does not identify the particular quantities, the process of FIG. 5 may have default values that may be used where the quantities were not supplied. Additionally or alternatively, the default values may be used in place of the quantities identified in the configuration information. For instance, if the configuration information for a component identifies that one subnet is desired but the default quantities for that type of subnet range between two and four subnets, a default quantity of two may be used for that component for the provisioning of the project. Further, for final deployment, a default quantity of subnets for the subnet type may range between six and 10 subnets. Where no quantity of subnets has been identified for the final deployment of the component, a value of six may be used as the quantity of desired subnets. Further, where the configuration information identifies a quantity higher than a default range, a top value of the range may be used (e.g., where 20 subnets are desired for final deployment, a value of 10 subnets may be used in lieu of the 20 value).

Subnets by Availability Zones and Types

FIG. 6 depicts a table identifying, for a set of subnets in a virtual private cloud, availability zones and characteristics of each subnet. The table of FIG. 6 identifies nine subnets having subnet identifications (IDs) 0-8. The subnets are associated with various availability zones A-E. The subnets are further identified in the table of FIG. 6 as being a public subnet or a private subnet type. The private subnet types may include database subnet types, API subnet types, and application (APP) subnet types. Other private subnet types may be used in addition to or in place of these private subnet types. The public subnet types may include subnets that are accessible via the open Internet including but not limited to traffic from the World Wide Web (Web). Some public subnets may respond to direct calls from within those specific subnets and direct calls from any other subnet or server. Other public subnets may be more restricted such that they only respond to direct calls from within the subnet. The subnet selection process 502 may use the information in the tale of FIG. 6 during a selection of the subnets for the components. The table of FIG. 6 may be stored in the virtual private cloud 302, local to a server that hosts the subnet selection process 502, and/or any other location within or outside of the virtual private cloud 302.

Processes for Selecting Subnets

Figure 7:
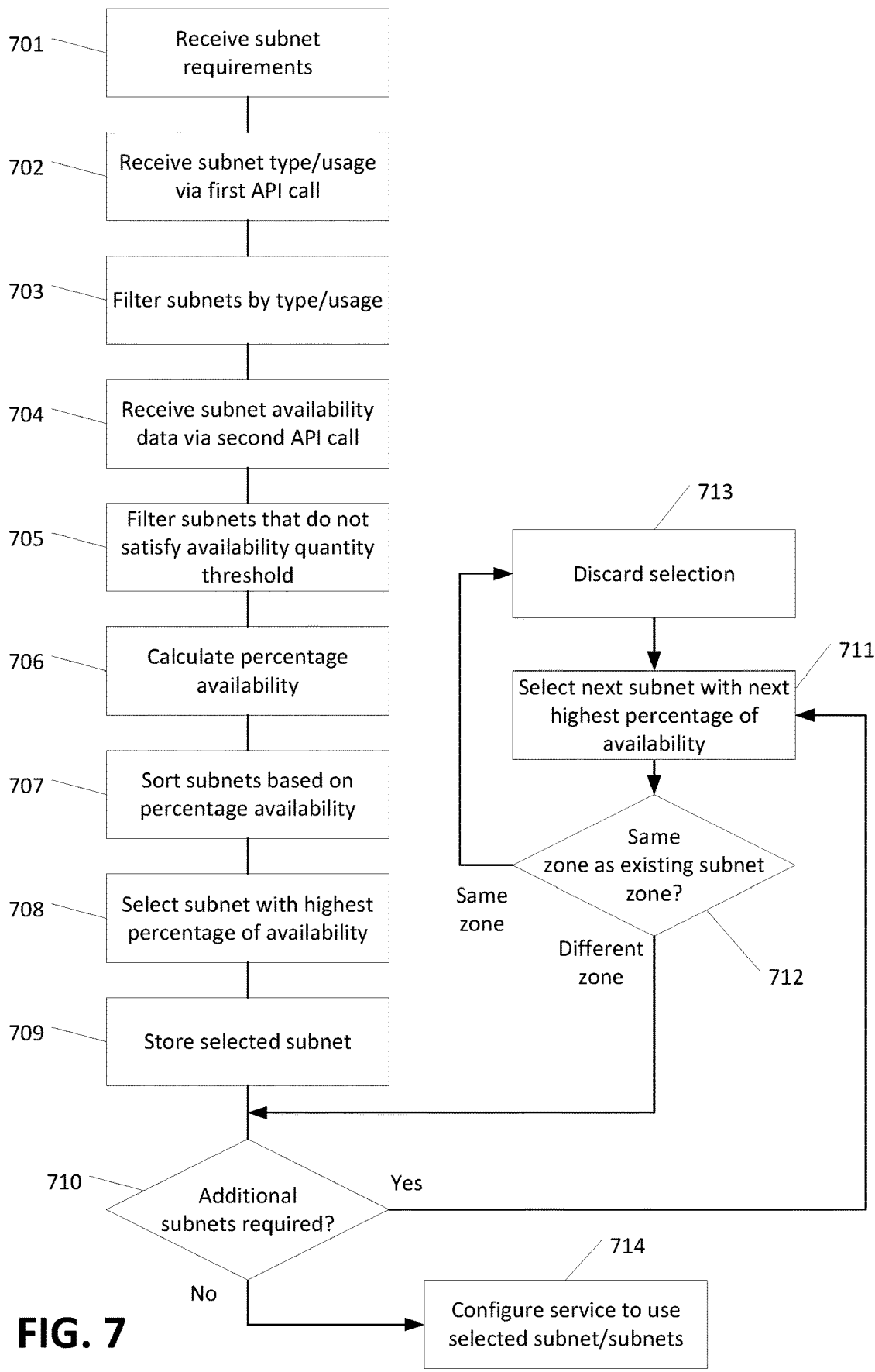
FIG. 7 depicts a process of a callable service selecting subnets.

FIG. 7 depicts a process of a callable service selecting subnets. In step 701, a list of subnet requirements may be received. The list of subnet requirements may comprise a project under development or a final project. The project may include a quantity of components for a service. The list of subnet requirements received in step 701 may be received as part of an API call from a developer's computing device or other computing device.

In step 702, the process requests and receives a list of subnets in the virtual private cloud 302. The information associated with the list of subnets received in step 702 may be limited to the type of each subnet. Additionally or alternatively, the information may comprise usage information for each subnet (e.g., a total quantity of IP addresses in each subnet and/or how many IP addresses are available in each subnet). The request of step 702 may be an API call to a virtual private cloud 302 or a server that maintains the desired information of the subnets in the virtual private cloud 302.

In step 703, the process filters the received list of subnets by usage type. For instance, where the configuration information specifies that database and private API-type subnets are desired, the process 703 may filter the received list of subnets to only include subnets matching the database subnet type and subnets matching the API subnet type. The subnets filtered out by step 703 may be discarded or retained. If retained, the process 703, when run for a new configuration, may filter again the previously received list of subnet types. Otherwise, the process 703 may filter a newly received list of subnet types.

In step 704, another API call is made to obtain availability data for each of the filtered subnets. The availability data may include, if not previously received, a total quantity of IP addresses in each subnet and available IP addresses in each subnet. The available IP addresses may be provided as part of the returned information from the API call. Alternatively, the available IP information may be obtained from a received list of consumed IP addresses and filtering all the IP addresses to remove the consumed IP addresses.

The configuration information received in step 701 may identify, for each type of subnet, a quantity of IP addresses needed from each subnet. In step 705, the list of subnets may be filtered by the quantity of available IP addresses and by subnet type. Those subnets of the desired subnet type not meeting the minimum available IP address quantity may be removed from the list of candidate subnets.

In step 706, the process may calculate a percentage of available IP addresses over the total IP addresses for each subnet. Step 706 may be performed after step 705, in parallel with step 705, or before step 705. The percentage of available IP addresses may be calculated based on information received from step 704. Additionally or alternatively, the percentage of available IP addresses may be received in response to the API call of step 704 from the entity providing the subnet information.

In step 707, the subnets are sorted by each's IP address availability. The sorting of step 707 may be performed separately from step 706 or may be performed as part of step 706.

In step 708, the process selects, for the component needing a subnet or subnets of a specified type, a subnet of the specific type with the highest availability. The selection process of step 708 may comprise a single selection in which both the greatest percentage availability and subnet type are the selection criteria. Alternatively, the selection process of step 708 may comprise multiple selection processes including, for instance, selecting all subnets of a desired type and then selecting, from those subnets of the given type, the subnet with the highest percentage availability. The order of these two selection processes may be reversed.

In step 709, the selected subnet of the given subnet type is stored. The storage of the subnet may be part of the configuration information for the component. Additionally or alternatively, the subnet may be stored in a temporary list of subnets.

In step 710, the process determines whether additional subnets are required for the provisioning of the project. If no additional subnets are required, the process provisions the configuration information in step 714 to use the selected subnet or selected subnets. Step 714 may only identify the subnet to be used. If no IP address is assigned in step 714, the subnet may assign the particular IP addresses to be used by the component. The assignment may be static or may be dynamic. Alternatively, the process 714 may identify particular IP addresses within each subnet for the component or components to use.

If determined that additional subnets are required in step 714, in step 715 the next subnet in the sorted list of subnets may be selected. The selection in step 715 may be a single selection process in which both the subnet type and the highest percentage of available IP addresses in the subnets are used to select the next subnet. Alternatively, the selection in step 715 may comprise multiple steps including selecting all subnets of a given type and then the subnet of those selected subnets with the highest percentage of available IP addresses. The order of these multiple selections may be reversed.

In step 712, an availability zone of the selected subnet from step 711 is compared to the availability zone of the selected subnet from step 708. The availability zones of the subnets selected in steps 708 and 711 may be stored as part of the selection of the subnets. Additionally or alternatively, the availability zones may be stored separately. If determined in step 712 that the availability zone of the subnet selected in step 711 is the same availability zone as the subnet selected in step 708, the subnet selected in step 711 is discarded in step 713 and a new subnet selected in step 711. The process of steps 711, 712, and 713 continues until a subnet in a different availability zone is selected. Once the new subnet is selected, the process returns to step 710 to determine whether additional subnets are required.

Where multiple additional subnets are required, step 711 may select the additional subnets. The comparison of step 712 may include a determination of whether the availability zone of the subnet selected in step 711 matches the availability zone selected in step 708 and may also determine whether the newly selected subnet in step 711 matches an availability zone of any previously selected subnet from a previous execution of step 711.

Figure 8:
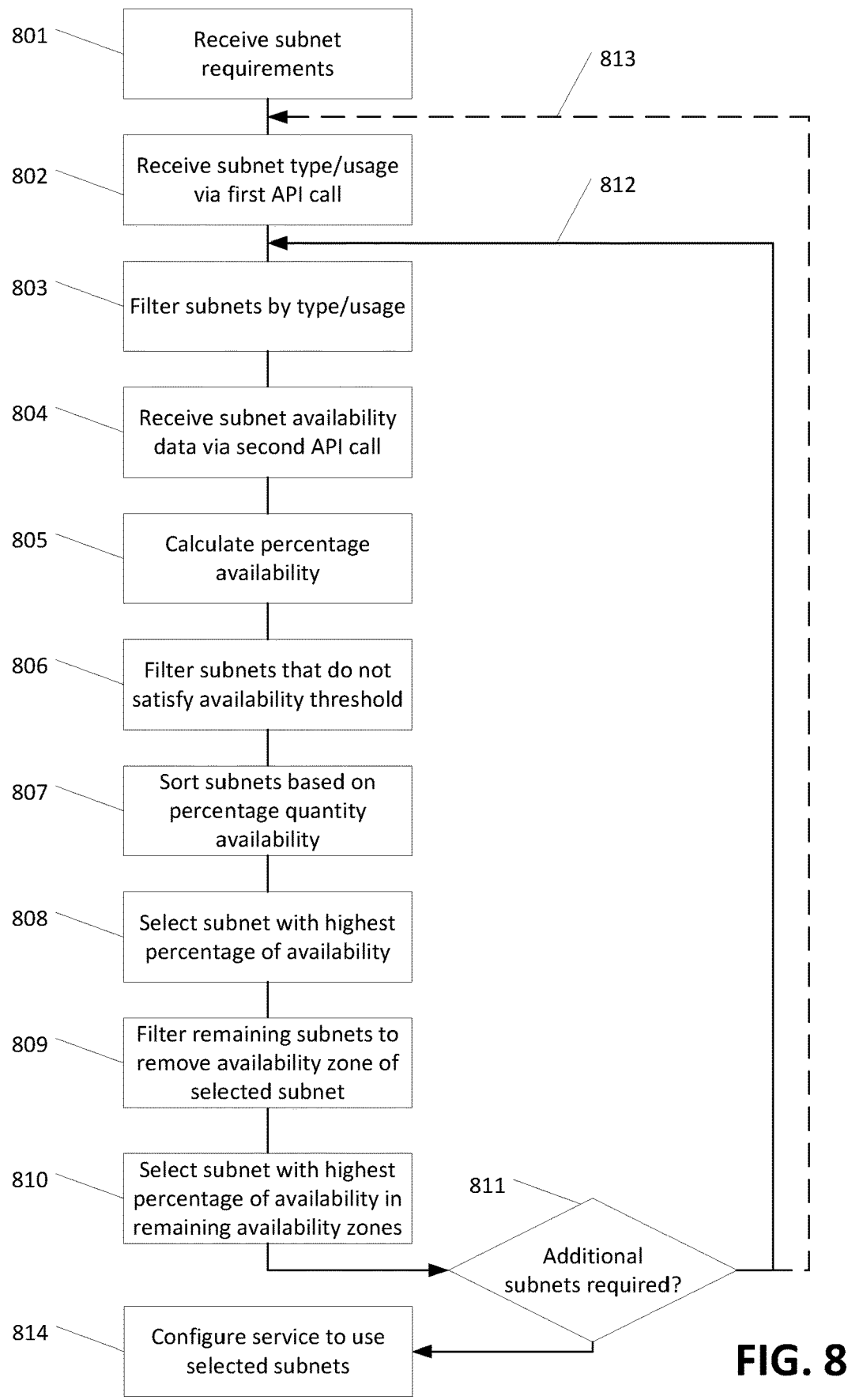
FIG. 8 depicts a process of a callable service selecting subnets.

FIG. 8 depicts a process of a callable service selecting subnets. In step 801, a list of subnet requirements may be received. The list of subnet requirements may comprise a project under development or a final project. The project may include a quantity of components for a service. The list of subnet requirements received in step 801 may be received as part of an API call from a developer's computing device or other computing device.

In step 802, the process requests and receives a list of subnets in the virtual private cloud 302. The information associated with the list of subnets received in step 802 may be limited to the type of each subnet. Additionally or alternatively, the information may comprise usage information for each subnet (e.g., a total quantity of IP addresses in each subnet and/or how many IP addresses are available in each subnet). The request of step 802 may be an API call to a virtual private cloud 302 or a server that maintains the desired information of the subnets in the virtual private cloud 302.

In step 803, the process filters the received list of subnets by usage type. For instance, where the configuration information specifies that database and private API-type subnets are desired, the process 803 may filter the received list of subnets to only include subnets matching the database subnet type and subnets matching the API subnet type. The subnets filtered out by step 803 may be discarded or retained. If retained, the process 803, when run for a new configuration, may filter again the previously received list of subnet types. Otherwise, the process 803 may filter a newly received list of subnet types.

In step 804, another API call is made to obtain availability data for each of the filtered subnets. The availability data may include, if not previously received, a total quantity of IP addresses in each subnet and available IP addresses in each subnet. The available IP addresses may be provided as part of the returned information from the API call. Alternatively, the available IP information may be obtained from a received list of consumed IP addresses and filtering all the IP addresses to remove the consumed IP addresses.

The configuration information received in step 801 may identify, for each type of subnet, a quantity of IP addresses needed from each subnet. In step 805, the process may calculate a percentage of available IP addresses over the total IP addresses for each subnet. The percentage of available IP addresses may be calculated based on information received from step 804. Additionally or alternatively, the percentage of available IP addresses may be received in response to the API call of step 804 from the entity providing the subnet information.

In step 806, the list of subnets may be filtered by the quantity of available IP addresses and by subnet type. Those subnets of the desired subnet type not meeting the minimum available IP address quantity may be removed from the list of candidate subnets. Step 806 may be performed after step 805, in parallel with step 805, or before step 805.

In step 807, the subnets are sorted by each's IP address availability. The sorting of step 807 may be performed separately from step 806 or may be performed as part of step 806.

In step 808, the process selects, for the component needing a subnet or subnets of a specified type, a subnet of the specific type with the highest availability. The selection process of step 808 may comprise a single selection in which both the greatest percentage availability and subnet type are the selection criteria. Alternatively, the selection process of step 808 may comprise multiple selection processes including, for instance, selecting all subnets of a desired type and then selecting, from those subnets of the given type, the subnet with the highest percentage availability. The order of these two selection processes may be reversed. The result may be stored. The storage of the subnet may be part of the configuration information for the component. Additionally or alternatively, the subnet may be stored in a temporary list of subnets.

In step 809, the remaining subnets may be filtered to remove the availability zone of the subnet selected in step 808. The subnets may be filtered specifically for those of a desired subnet type. Alternatively or additionally, the subnets may not be filtered for a specific type but the type selection may be part of the selection of step 808.

In step 810, a subnet with the highest percentage of IP address availability is selected. Because the subnets available for selection in step 810 were previously filtered to remove subnets matching the availability zones of previously selected subnets, the selected subnet of step 810 will have a different availability zone from those of the previously selected subnets.

In step 811, the process determines whether additional subnets are required for the provisioning of the project. If no additional subnets are required, the process provisions the configuration information in step 814 to use the selected subnet or selected subnets. Step 814 may only identify the subnet to be used. If no IP address is assigned in step 814, the subnet may assign the particular IP addresses to be used by the component. The assignment may be static or may be dynamic. Alternatively, the process 814 may identify particular IP addresses within each subnet for the component or components to use.

If determined that additional subnets are required in step 811, the process continues with step 803 as shown by solid arrow 812. Alternatively, the process may continue with step 802 as shown by dashed arrow 813.

Project Provisioning

Figure 9:
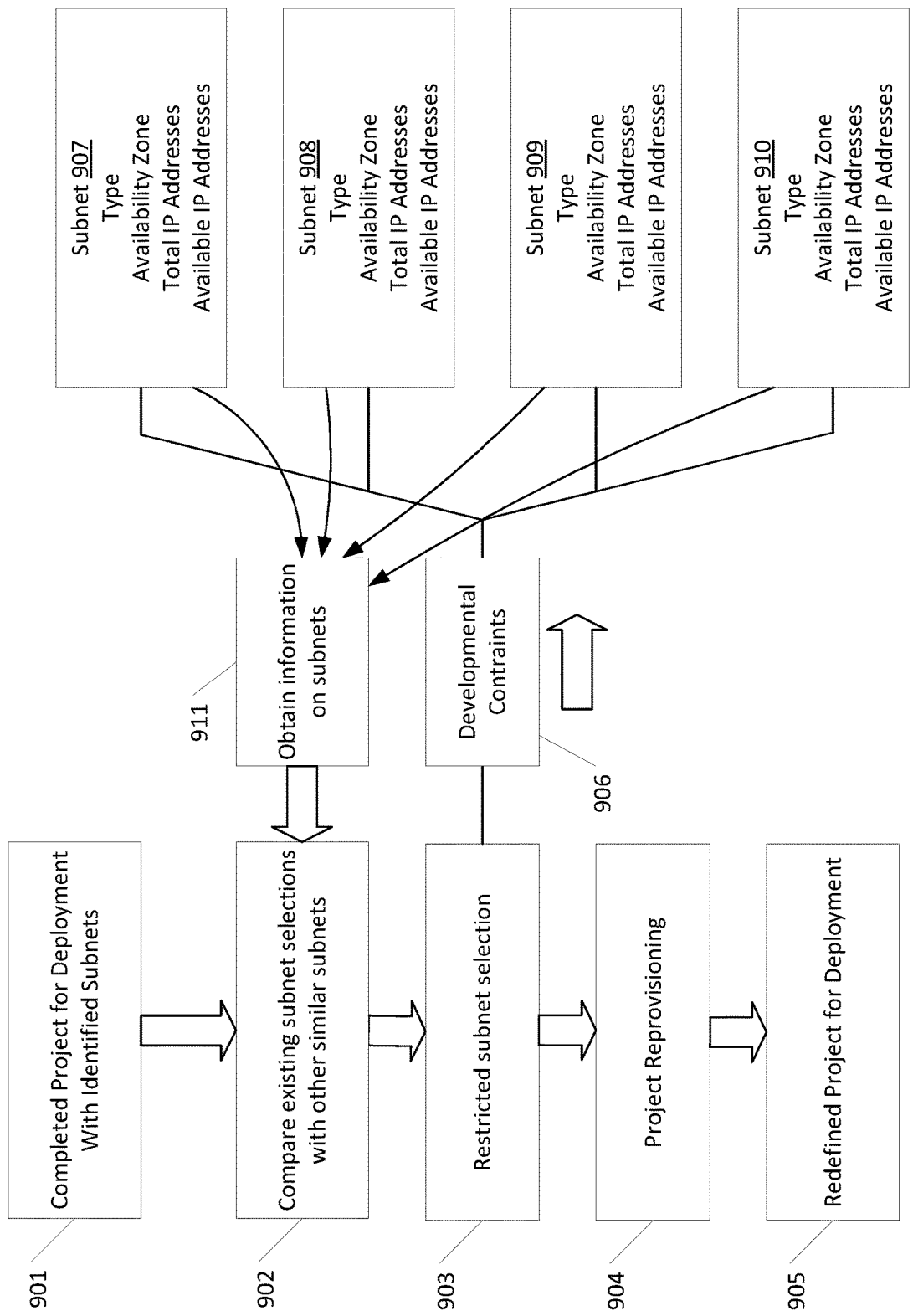
FIG. 9 depicts a process of a callable service selecting subnets.

FIG. 9 depicts a process of a callable service selecting subnets. Sometimes, a project may need to be reprovisioned to account for new configuration information. For instance, a particular component may need to be modified to increase its quantity of subnets and/or IP addresses. Alternatively, an existing project to be deployed may need backup subnet assignments to account for failovers in the event of an unavailable availability zone. In step 901, a completed project with previously assigned subnets is received.

In step 902, the existing subnet selections in the completed project are compared with similar subnets to find subnets with similar characteristics. Similar characteristics may include matching subnet types. Additionally or alternatively, similar characteristics may include similar percentages of available IP addresses.

In step 903, the available subnets are filtered to remove subnets in previously used availability zones of the existing subnet selections. The existing subnet selections received in step 901 may include their availability zones. Additionally or alternatively, the availability zones of the existing subnet selections may be separately obtained, e.g., from the subnets directly or from a server with that information. In step 903, information on the filtered subnets is requested, e.g., via developmental constraints 906, from the subnets 907-910. The information from the subnets 907-910 may be received in step 903. Based on the received information from the restricted set of subnets, new subnets may be selected for the components (e.g., as backup subnets).

In step 904, the project may be reprovisioned to include the replacement or backup subnets. In step 905, the reprovisioned project may be deployed with the replacement and/or backup subnet selections. Additionally or alternatively, the information regarding the subnets may be separately received, at step 902, via process step 911. By retrieving the information from the subnets earlier, a greater quantity of subnet information may be received. In one example, that greater quantity of subnet information may permit fewer calls to the subnets or server with the subnet information.

According to one or more aspects, a computer-implemented method may comprise receiving, from a remote computing device, a first application programming interface (API) call identifying a quantity of required subnet types, sending, to a domain name service of a virtual private cloud, a second API call requesting a first list of subnets, and receiving, based on the second API call, the first list of subnets comprising, for each received subnet, a received subnet identification and a received subnet type. The computer-implemented method may further comprise determining, based on the required subnet types, a filtered list of received subnets with received subnet types that match the required subnet types and sending, to the domain name service, a third API call comprising the filtered list of the received subnets. The third API call may request second information regarding the filtered list of the received subnets. The computer-implemented method may further comprise receiving, based on the third API call, the second information, determining, based on a quantity of unassigned IP addresses of each subnet in the second information, a second list of subnets satisfying a minimum availability threshold, selecting, based on a percentage of available IP addresses of each subnet in the second information and the required subnet types of the required subnets, a first selected subnet having a highest percentage of available IP addresses and a first availability zone, and sending, based on the first API call to the remote computing device, the first selected subnet and a subnet type of first selected subnet.

In further aspects, the second information may comprise a total quantity of IP addresses of each subnet and a quantity of assigned IP addresses of each subnet. The computer-implemented method may further comprise calculating, based on the second information, the quantity of unassigned IP addresses of each subnet in the second information. Additionally or alternatively, the second information may comprise a total quantity of IP addresses of each subnet and a quantity of assigned IP addresses of each subnet, and the method may include calculating, based on the second information, a percentage of available IP addresses of each subnet in the second information.

Additionally or alternatively, the method may further include selecting, based on the percentage of available IP addresses of each subnet, based on the second list of subnets, and based on the required subnet types, a second selected subnet having a second highest percentage of available IP addresses. A second availability zone of the second selected subnet may be different from the first availability zone. The sending of the first selected subnet further may comprise sending the second selected subnet as a second subnet of the required subnets.

Additionally or alternatively, the method may further include selecting, based on the first availability zone, based on the second availability zone, and based on a remaining quantity of required subnet types, additional subnets based on those subnets with the highest percentages of available IP addresses. An availability zone of each of the selected additional subnets may be diverse from the first availability zone, from the second availability zone, and from the availability zones of the additional subnet. The sending of the first selected subnet further may comprise sending the selected additional subnets as the remaining quantity of the required subnets.

Additionally or alternatively, the method may further include: selecting, based on the selection of the first selected subnet, based on the percentage of available IP addresses of each subnet, based on the second list of subnets, and based on the required subnet types of the required subnets, a second selected subnet having a second highest percentage of available IP addresses; determining that a second availability zone of the second selected subnet matches the availability zone of the first selected subnet; discarding the selection of the second selected subnet; and selecting, based on the percentage of available IP addresses of each subnet, based on the second list of subnets, and based on the required subnet types, a third subnet having a third highest percentage of available IP addresses. A third availability zone of the third subnet is different from the availability zone of the first selected subnet. The sending of the first selected subnet further may comprise sending the third subnet as a second subnet of the required subnets.

Additionally or alternatively, the method may further include: selecting determining, based on the selection of the first selected subnet, that the quantity of required subnets has not been satisfied; and selecting, based on the determination that the quantity of required subnets has not been satisfied, based on the percentage of available IP addresses of each subnet, based on the second list of subnets, and based on the required subnet types, a second selected subnet having a second highest percentage of available IP addresses. A second availability zone of the second selected subnet is different from the first availability zone of the first selected subnet. The sending of the first selected subnet further may comprise sending the second selected subnet as a second subnet of the required subnets.

Additionally or alternatively, the method may further include: determining, based on required subnet types, based on the availability zone of the first selected subnet, based on a second filtered list of subnets with received subnet types, based on matching the required subnet types, and based on availability zones, not matching the first availability zone of the first selected subnet; and selecting, from the second filtered list of subnets, a second selected subnet having a highest percentage of available IP addresses. The method may further comprise sending the second selected subnet as a second subnet of the required subnets.

Additionally or alternatively, the method may further include determining, for each remaining required subnet and based on the required subnet types of the required subnets and based on availability zones of previously selected subnets, filtered lists of subnets; and selecting, from the filtered lists of subnets, additional subnets based on those subnets with the highest percentages of available IP addresses. The method may send the selected additional subnets as the required subnets. The filtered list of subnets may comprise subnets with subnet types matching the required subnet types of remaining required subnets. The filtered list of subnets may comprise subnets with availability zones not matching the availability zone of the previously selected subnets.

Additionally or alternatively, the required subnet type may identify the subnet as a private database type of subnet configured to host a database; a private API type of subnet configured to host a service for receiving and responding to API calls; an application type of subnet configured to host a service for supporting an application executing on a mobile device; a first public web-based type of subnet configured to respond only to intra-subnet communications; or a second public web-based type of subnet configured to respond to intra-subnet communications and inter-subnet communications.

An apparatus, in accordance with various aspects, may comprise one or more processors; and memory storing computer-executable instructions that, when executed, cause the one or more processors to: receive, from a remote computing device, a first API call identifying a quantity of required subnet types; send, to a domain name service of a virtual private cloud, a second API call, e.g., requesting a first list of subnets; receive, based on the second API call, the first list of subnets comprising, for each received subnet, a received subnet identification and a received subnet type; determine, based on the required subnet types, a filtered list of received subnets with received subnet types that match the required subnet types; send, to the domain name service, a third API call comprising the filtered list of the received subnets that requests second information regarding the filtered list of the received subnets; receive, based on the third API call, the second information, wherein the second information may comprise a total quantity of IP addresses of each subnet and a quantity of assigned IP addresses of each subnet; and calculate, based on the second information, a quantity of unassigned IP addresses of each subnet in the second information. The instructions may further determine, based on a quantity of unassigned IP addresses of each subnet in the second information, a second list of subnets satisfying a minimum availability threshold; select, based on a percentage of available IP addresses of each subnet in the second information and the required subnet types of the required subnets, a first selected subnet having a highest percentage of available IP addresses and a first availability zone; and send, based on the first API call and to the remote computing device, the first selected subnet and a subnet type of first selected subnet.

In further aspects, the instructions may cause the one or more processors to calculate, based on the second information, a percentage of available IP addresses of each subnet in the second information. Additionally or alternatively, the instructions may cause the one or more processors to select, based on the percentage of available IP addresses of each subnet, based on the second list of subnets, and based on the required subnet types, a second selected subnet having a second highest percentage of available IP addresses. A second availability zone of the second selected subnet may be different from the first availability zone. The instructions to send the first selected subnet may cause the one or more processors to send the second selected subnet as a second subnet of the required subnets. In further aspects, the instructions may cause the one or more processors to select, based on the first availability zone, based on the second availability zone, and based on a remaining quantity of required subnet types, additional subnets based on those subnets with the highest percentages of available IP addresses. An availability zone of each of the selected additional subnets may be diverse from the first availability zone, from the second availability zone, and from the availability zones of the additional subnets. The instructions may further cause the one or more processors to send the selected additional subnets as the remaining quantity of the required subnets.

Additionally or alternatively, the instructions may cause the one or more processors to select, based on the selection of the first selected subnet, based on the percentage of available IP addresses of each subnet, based on the second list of subnets, and based on the required subnet types of the required subnets, a second selected subnet having a second highest percentage of available IP addresses; determine that a second availability zone of the second selected subnet matches the availability zone of the first selected subnet; discard the selection of the second selected subnet; and select, based on the percentage of available IP addresses of each subnet, based on the second list of subnets, and based on the required subnet types, a third subnet having a third highest percentage of available IP addresses. A third availability zone of the third subnet may be different from the availability zone of the first selected subnet. The instructions may send the first selected subnet and the third subnet as a second subnet of the required subnets.

Additionally or alternatively, the instructions may cause the one or more processors to determine, based on the selection of the first selected subnet, that the quantity of required subnets has not been satisfied; and select, based on the determination that the quantity of required subnets has not been satisfied, based on the percentage of available IP addresses of each subnet, based on the second list of subnets, and based on the required subnet types, a second selected subnet having a second highest percentage of available IP addresses. A second availability zone of the second selected subnet may be different from the first availability zone of the first selected subnet. The second selected subnet may be sent as a second subnet of the required subnets.

Additionally or alternatively, the instructions may cause the one or more processors to determine, based on required subnet types, based on the first availability zone of the first selected subnet, based on a second filtered list of subnets with received subnet types, based on matching the required subnet types, and based on availability zones, not matching the first availability zone of the first selected subnet; and select, from the second filtered list of subnets, a second selected subnet having a highest percentage of available IP addresses. The second selected subnet may be sent as a second subnet of the required subnets.

Additionally or alternatively, the instructions may cause the one or more processors to determine, for each remaining required subnet and based on the required subnet types of the required subnets and based on availability zones of previously selected subnets, filtered lists of subnets; and select, from the filtered lists of subnets, additional subnets based on those subnets with the highest percentages of available IP addresses. The selected additional subnets may be sent as the required subnets. The filtered list of subnets may comprise subnets with subnet types matching the required subnet types of remaining required subnets. The filtered list of subnets may comprise subnets with availability zones not matching the availability zone of the previously selected subnets.

In further aspects, the instructions may cause the one or more processors to identify the subnet as a private database type of subnet configured to host a database; a private API type of subnet configured to host a service for receiving and responding to API calls; an application type of subnet configured to host a service for supporting an application executing on a mobile device; a first public web-based type of subnet configured to respond only to intra-subnet communications; or a second public web-based type of subnet configured to respond to intra-subnet communications and inter-subnet communications.

In one or more aspects, a non-transitory media may store instructions that, when executed by one or more processors, cause the one or more processors to perform steps comprising receiving, from a remote computing device, a first application programming interface (API) call, wherein the first API call identifies a quantity of required subnet types; sending, to a domain name service of a virtual private cloud, a second API call, wherein the second API call requests a first list of subnets; receiving, based on the second API call, the first list of subnets comprising, for each received subnet, a received subnet identification and a received subnet type; determining, based on the required subnet types, a filtered list of received subnets with received subnet types that match the required subnet types; and sending, to the domain name service, a third API call comprising the filtered list of the received subnets, wherein the third API call requests second information regarding the filtered list of the received subnets. The instructions may further cause the one or more processors to perform steps comprising receiving, based on the third API call, the second information; determining, based on a quantity of unassigned IP addresses of each subnet in the second information, a second list of subnets satisfying a minimum availability threshold; selecting, based on a percentage of available IP addresses of each subnet in the second information and the required subnet types of the required subnets, a first selected subnet having a highest percentage of available IP addresses and a first availability zone; and sending, based on the first API call and to the remote computing device, the first selected subnet and a subnet type of first selected subnet.

Other embodiments of this aspect include corresponding computer systems, apparatus, and computer programs recorded on one or more computer storage devices, each configured to perform the actions of the methods.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving, from a remote computing device, a first application programming interface (API) call, wherein the first API call identifies a quantity of required subnet types;
sending, to a domain name service of a virtual private cloud, a second API call, wherein the second API call requests a first list of subnets;
receiving, based on the second API call, the first list of subnets comprising, for each received subnet, a received subnet identification and a received subnet type;
determining, based on the required subnet types, a filtered list of received subnets with received subnet types that match the required subnet types;
sending, to the domain name service, a third API call comprising the filtered list of the received subnets, wherein the third API call requests second information regarding the filtered list of the received subnets;
receiving, based on the third API call, the second information;
determining, based on a quantity of unassigned IP addresses of each subnet in the second information, a second list of subnets satisfying a minimum availability threshold;
selecting, based on a percentage of available IP addresses of each subnet in the second information and the required subnet types, a first selected subnet having a highest percentage of available IP addresses and a first availability zone; and
sending, based on the first API call and to the remote computing device, the first selected subnet and a subnet type of first selected subnet.

2. The method of claim 1, wherein the second information comprises a total quantity of IP addresses of each subnet and a quantity of assigned IP addresses of each subnet, the method further comprising:
calculating, based on the second information, the quantity of unassigned IP addresses of each subnet in the second information.

3. The method of claim 1, wherein the second information comprises a total quantity of IP addresses of each subnet and a quantity of assigned IP addresses of each subnet, the method further comprising:
calculating, based on the second information, the percentage of available IP addresses of each subnet in the second information.

4. The method of claim 1, further comprising:
selecting, based on the percentage of available IP addresses of each subnet, based on the second list of subnets, and based on the required subnet types, a second selected subnet having a second highest percentage of available IP addresses,
wherein a second availability zone of the second selected subnet is different from the first availability zone, and
wherein the sending the first selected subnet further comprises sending the second selected subnet as a second subnet of the required subnet types.

5. The method of claim 4, further comprising:
selecting, based on the first availability zone, based on the second availability zone, and based on a remaining quantity of the required subnet types, additional subnets based on those subnets with the highest percentages of available IP addresses,
wherein an availability zone of each of the selected additional subnets is diverse from the first availability zone, from the second availability zone, and from availability zones of other selected additional subnets, and
wherein the sending the first selected subnet further comprises sending the selected additional subnets as the remaining quantity of the required subnet types.

6. The method of claim 1, further comprising:
selecting, based on the selection of the first selected subnet, based on the percentage of available IP addresses of each subnet, based on the second list of subnets, and based on the required subnet types, a second selected subnet having a second highest percentage of available IP addresses;

determining that a second availability zone of the second selected subnet matches the first availability zone of the first selected subnet;

discarding the selection of the second selected subnet; and selecting, based on the percentage of available IP addresses of each subnet, based on the second list of subnets, and based on the required subnet types, a third subnet having a third highest percentage of available IP addresses, wherein a third availability zone of the third subnet is different from the first availability zone of the first selected subnet, and wherein the sending the first selected subnet further comprises sending the third subnet as a second subnet of the required subnet types.

7. The method of claim 1, further comprising:

determining, based on the selection of the first selected subnet, that the quantity of required subnet types has not been satisfied; and selecting, based on the determination that the quantity of required subnet types has not been satisfied, based on the percentage of available IP addresses of each subnet, based on the second list of subnets, and based on the required subnet types, a second selected subnet having a second highest percentage of available IP addresses, wherein a second availability zone of the second selected subnet is different from the first availability zone of the first selected subnet, and wherein the sending the first selected subnet further comprises sending the second selected subnet as a second subnet of the required subnet types.

8. The method of claim 1, further comprising:

determining, based on the required subnet types, based on the first availability zone of the first selected subnet, based on matching the required subnet types, and based on availability zones, of remaining subnets of the filtered list of received subnets, not matching the first availability zone of the first selected subnet, a second filtered list of received subnets; and selecting, from the second filtered list of received subnets, a second selected subnet having a highest percentage of available IP addresses, wherein the sending the first selected subnet further comprises sending the second selected subnet as a second subnet of the required subnet types.

9. The method of claim 1, further comprising:

determining, for each remaining required subnet type and based on the required subnet types and based on availability zones of previously selected subnets, filtered lists of subnets; and selecting, from the filtered lists of subnets, additional subnets based on those subnets with highest percentages of available IP addresses, wherein the sending the first selected subnet further comprises sending the selected additional subnets as the required subnets types, wherein the filtered list of subnets comprise subnets with subnet types matching the required subnet types of remaining required subnet types, and wherein the filtered list of subnets comprise subnets with availability zones not matching the availability zones of the previously selected subnets.

10. The method of claim 1, wherein a subnet type comprises: a private database type of subnet configured to host a database; a private API type of subnet configured to host a service for receiving and responding to API calls; an application type of subnet configured to host a service for supporting an application executing on a mobile device; a first public web-based type of subnet configured to respond only to intra-subnet communications; or a second public web-based type of subnet configured to respond to intra-subnet communications and inter-subnet communications.

11. An apparatus comprising:

one or more processors; and memory storing computer-executable instructions that, when executed, cause the one or more processors to:

receive, from a remote computing device, a first application programming interface (API) call, wherein the first API call identifies a quantity of required subnet types;

send, to a domain name service of a virtual private cloud, a second API call, wherein the second API call requests a first list of subnets;

receive, based on the second API call, the first list of subnets comprising, for each received subnet, a received subnet identification and a received subnet type;

determine, based on the required subnet types, a filtered list of received subnets with received subnet types that match the required subnet types;

send, to the domain name service, a third API call comprising the filtered list of the received subnets, wherein the third API call requests second information regarding the filtered list of the received subnets;

receive, based on the third API call, the second information, wherein the second information comprises a total quantity of IP addresses of each subnet and a quantity of assigned IP addresses of each subnet;

calculate, based on the second information, a quantity of unassigned IP addresses of each subnet in the second information;

determine, based on a quantity of unassigned IP addresses of each subnet in the second information, a second list of subnets satisfying a minimum availability threshold;

select, based on a percentage of available IP addresses of each subnet in the second information and the required subnet types, a first selected subnet having a highest percentage of available IP addresses and a first availability zone; and send, based on the first API call and to the remote computing device, the first selected subnet and a subnet type of first selected subnet.

12. The apparatus of claim 11, further comprising instructions that cause the one or more processors to:

calculate, based on the second information, the percentage of available IP addresses of each subnet in the second information.

13. The apparatus of claim 11, further comprising instructions that cause the one or more processors to:

select, based on the percentage of available IP addresses of each subnet, based on the second list of subnets, and based on the required subnet types, a second selected subnet having a second highest percentage of available IP addresses, wherein a second availability zone of the second selected subnet is different from the first availability zone, and wherein the instructions to send the first selected subnet cause the one or more processors to send the second selected subnet as a second subnet of the required subnet types.

14. The apparatus of claim 13, further comprising instructions that cause the one or more processors to:

select, based on the first availability zone, based on the second availability zone, and based on a remaining quantity of the required subnet types, additional subnets based on those subnets with highest percentages of available IP addresses,
wherein an availability zone of each of the selected additional subnets is diverse from the first availability zone, from the second availability zone, and from availability zones of other selected additional subnets, and
wherein the instructions to send the first selected subnet cause the one or more processors to send the selected additional subnets as the remaining quantity of the required subnet types.

15. The apparatus of claim 11, further comprising instructions that cause the one or more processors to:
select, based on the selection of the first selected subnet, based on the percentage of available IP addresses of each subnet, based on the second list of subnets, and based on the required subnet types, a second selected subnet having a second highest percentage of available IP addresses;
determine that a second availability zone of the second selected subnet matches the first availability zone of the first selected subnet;
discard the selection of the second selected subnet; and
select, based on the percentage of available IP addresses of each subnet, based on the second list of subnets, and based on the required subnet types, a third subnet having a third highest percentage of available IP addresses,
wherein a third availability zone of the third subnet is different from the first availability zone of the first selected subnet, and
wherein the instructions to send the first selected subnet cause the one or more processors to send the third subnet as a second subnet of the required subnet types.

16. The apparatus of claim 11, further comprising instructions that cause the one or more processors to:
determine, based on the selection of the first selected subnet, that the quantity of required subnet types has not been satisfied; and
select, based on the determination that the quantity of required subnet types has not been satisfied, based on the percentage of available IP addresses of each subnet, based on the second list of subnets, and based on the required subnet types, a second selected subnet having a second highest percentage of available IP addresses,
wherein a second availability zone of the second selected subnet is different from the first availability zone of the first selected subnet, and
wherein the instructions to send the first selected subnet cause the one or more processors to send the second selected subnet as a second subnet of the required subnets types.

17. The apparatus of claim 11, further comprising instructions that cause the one or more processors to:
determine, based on the required subnet types, based on the first availability zone of the first selected subnet, based on matching the required subnet types, and based on availability zones, of remaining subnets of the filtered list of received subnets, not matching the first availability zone of the first selected subnet, a second filtered list of received subnets; and
select, from the second filtered list of received subnets, a second selected subnet having a highest percentage of available IP addresses,
wherein the instructions to send the first selected subnet cause the one or more processors to send the second selected subnet as a second subnet of the required subnet types.

18. The apparatus of claim 11, further comprising instructions that cause the one or more processors to:
determine, for each remaining required subnet type and based on the required subnet types and based on availability zones of previously selected subnets, filtered lists of subnets; and
select, from the filtered lists of subnets, additional subnets based on those subnets with highest percentages of available IP addresses,
wherein the instructions to send the first selected subnet cause the one or more processors to send the selected additional subnets as the required subnet types,
wherein the filtered list of subnets comprises subnets with subnet types matching the required subnet types of remaining required subnet types, and
wherein the filtered list of subnets comprises subnets with availability zones not matching the availability zones of the previously selected subnets.

19. The apparatus of claim 11, wherein a subnet type comprises: a private database type of subnet configured to host a database; a private API type of subnet configured to host a service for receiving and responding to API calls; an application type of subnet configured to host a service for supporting an application executing on a mobile device; a first public web-based type of subnet configured to respond only to intra-subnet communications; or a second public web-based type of subnet configured to respond to intra-subnet communications and inter-subnet communications.

20. One or more non-transitory computer-readable media storing instructions that, when executed by one or more processors, cause the one or more processors to perform steps comprising:
receiving, from a remote computing device, a first application programming interface (API) call, wherein the first API call identifies a quantity of required subnet types;
sending, to a domain name service of a virtual private cloud, a second API call, wherein the second API call requests a first list of subnets;
receiving, based on the second API call, the first list of subnets comprising, for each received subnet, a received subnet identification and a received subnet type;
determining, based on the required subnet types, a filtered list of received subnets with received subnet types that match the required subnet types;
sending, to the domain name service, a third API call comprising the filtered list of the received subnets, wherein the third API call requests second information regarding the filtered list of the received subnets;
receiving, based on the third API call, the second information;
determining, based on a quantity of unassigned IP addresses of each subnet in the second information, a second list of subnets satisfying a minimum availability threshold;
selecting, based on a percentage of available IP addresses of each subnet in the second information and the required subnet types, a first selected subnet having a highest percentage of available IP addresses and a first availability zone; and sending, based on the first API call and to the remote computing device, the first selected subnet and a subnet type of first selected subnet.

\* \* \* \* \*